Nov. 13, 1962 E. A. COESTER 3,063,657
BALLOON AND METHOD OF INFLATING THE SAME
Filed Dec. 21, 1959 2 Sheets-Sheet 1
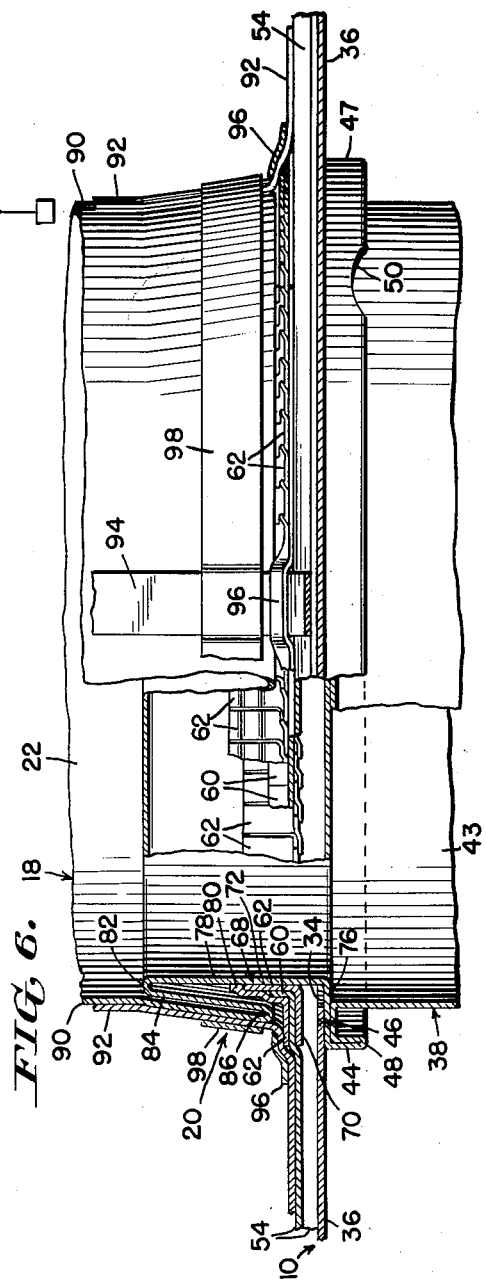
INVENTOR,
*Ernest A. Coester*
BY *Louis Sheldon*
ATTORNEY Nov. 13, 1962          E. A. COESTER          3,063,657
BALLOON AND METHOD OF INFLATING THE SAME
Filed Dec. 21, 1959          2 Sheets-Sheet 2
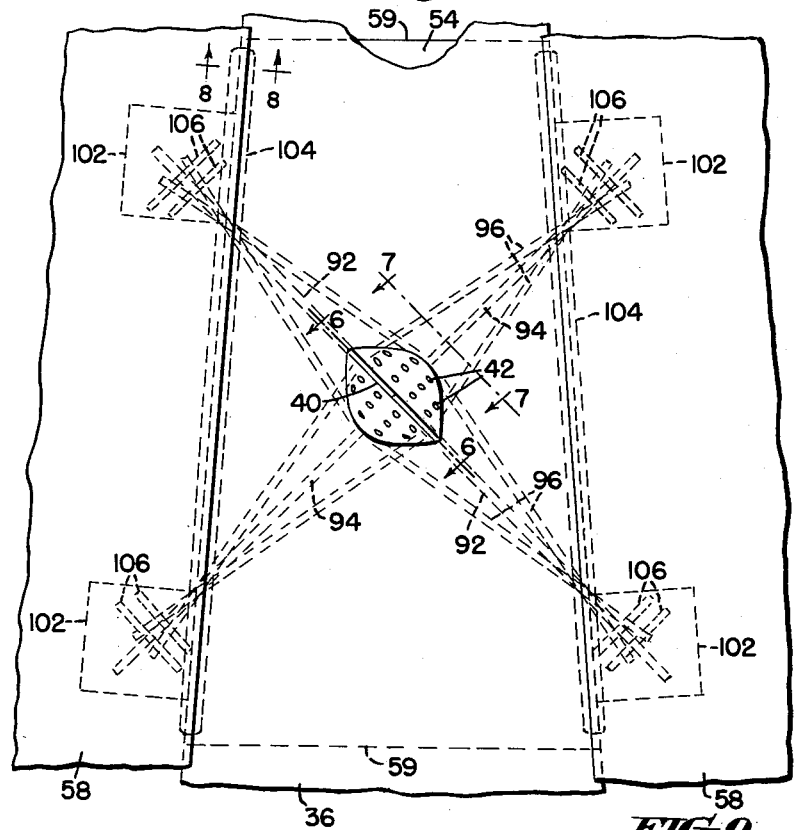
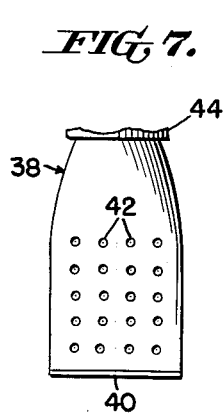
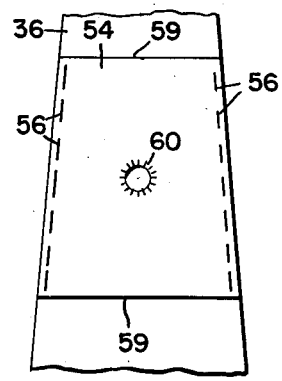
INVENTOR,
*Ernest A. Coester*
BY *Louis Sheldon*
ATTORNEY //united States Patent Office 3,063,657
Patented Nov. 13, 1962

3,063,657
BALLOON AND METHOD OF INFLATING
THE SAME
Ernest A. Coester, Minneapolis, Minn., assignor, by mesne assignments, to the United States of America as represented by the Secretary of the Navy
Filed Dec. 21, 1959, Ser. No. 861,157
9 Claims. (Cl. 244—31)

This invention relates to high altitude plastic film balloons and is concerned more particularly with the inflation and launching thereof.

Prior to this invention it was the general practice to inflate such a balloon by means of an inflation tube inserted through the base of the balloon to a position high in the top region (inflation bubble), requiring use of an open base appendix ballon and a two-arm launching platform, of which an example is illustrated in Melton Patent 2,764,-349. A considerable number of open base balloons were doomed to failure before they left the launching platform. The wind in the case of large balloons would twist the partially inflated balloon portion above the platform and thus often choke off the inflation gas feeding tube therein. To counteract this twisting, special measures had to be taken. One such measure involved the attachment of steering lines to equally spaced portions of the inflation bubble equator, and men to manipulate them. An alternative measure comprised the securement of the upper end of the inflation tube to the interior of the balloon.

It is an object of the invention to obviate the disadvantages inherent in prior inflation structures and practices.

More particularly, an object of the invention is to provide a means for inflating a balloon regardless whether or not the balloon is of the valving or sealed type.

Another object is to provide means enabling a valving type balloon ot be inflated regardless whether it has an open base or other valving appendix or is made to valve at any other part of the balloon.

A further object is to provide a balloon inflation means which will also serve as a means for steering the inflated portion of the balloon to prevent twisting thereof prior to launching.

Another object is to provide means enabling a balloon to be inflated with gas entering the bubble directly from the outside of the bubble.

An additional object is to provide an improved method of inflating a balloon.

Further objects and advantages of the invention will appear as the description proceeds.

The invention will be better understood on reference to the following description and the accompanying more or less schematic drawing, in which:

FIG. 1 is a side elevational view showing in full lines a balloon constructed in accordance with the invention and gathered and laid out ready for inflation, and in dot-dash lines the upper portion of the balloon partially inflated and accordingly erect.

FIG. 2 shows the balloon in two further stages of inflation.

FIG. 3 shows the balloon after completion of inflation and in the process of being launched.

FIG. 4 shows the balloon system at ceiling altitude.

FIG. 5 is a fragmentary inside view showing details of an illustrative embodiment of the connection between the inflation tube and the balloon envelope.

FIG. 6 is an enlarged fragmentary sectional view taken as indicated at 6—6 in FIG. 5.

FIG. 7 is a fragmentary elevational view taken as indicated at 7—7 in FIG. 5 and showing the portion of the inflation tube which extends within the balloon envelope.

FIG. 8 is an enlarged sectional view taken as indicated at 8—8 in FIG. 5.

FIG. 9 is a fragmentary elevational view showing the apron and its attachment to the envelope.

Referring now more particularly to the drawing, disclosing an illustrative embodiment of the invention, there is shown at 10 a balloon envelope formed of a number of gores each converging toward the top 12 and bottom 14 of the envelope, the gores being heat-sealed at 16 throughout their longitudinal margins. An inflation tube 18 is connected as generally indicated at 20 to the envelope 10 near the top 12 and communicates with the interior of the envelope and has an elongated portion 22 outside of the envelope and open at its outer end 24 (FIG. 1) until after inflation is completed.

In preparation for launching, the envelope 10 in gathered form (FIG. 1) extended over the ground and a launching platform such, for example, as may be provided by a truck 28, with a roller 30 extending entirely across and choking off the envelope just below the inflation tube connection 20, and with the entire tube free of the roller, the balloon envelope material from the top 12 to the roller constituting a compartment capable of containing only a fraction of the predetermined quantity of lift gas with which the balloon system is to be launched. Helium or other suitable lift gas is then introduced into the tube end 24, as by the nozzle of a hose connected to the gas supply (not shown), and enters the compartment, providing a small inflation bubble which assumes the position substantially as shown in dot-dash lines in FIG. 1. As inflation continues, the roller 30 is turned, by the gas pressure in the bubble, in the direction of the arrow 31 to pay out additional envelope material, or hand pulling on the material may be resorted to for this purpose. When the bubble is of sufficient size to provide the predetermined free lift, the supply is shut off, the nozzle removed from the tube, and the tube tied closed as shown at 32 (FIGS. 3 and 4), or at any convenient location which may be accessible for "tie-off" at termination of the balloon inflation. With this procedure and structure the envelope material is paid out during inflation only in the amount necessary to accommodate additional inflation gas, so that sail area is kept to a minimum. Moreover, the operator holding the inflation tube portion 22 during inflation and until the launching movement of the roller 30 is underway (see below) can steer and help stabilize the bubble so as to overcome any tendency of the wind to whip or twist the bubble.

When the payload and other equipment to be borne by the envelope 10 is attached, and inflation is completed, and launching of the balloon system is to proceed, the tied-off tube is released by an operator, whereupon the balloon bubbles rises, turning the retaining platform roller 30 to pay out more envelope material (FIG. 3). The roller 30 is then released by an operator. This will enable the part of the balloon system above the payload to erect. Upon release of the payload, the balloon system will become completely airborne. Of course the bubble at launching occupies a small fraction of the volumetric capacity of the envelope.

The tube 18 extends through a hole 34 (FIG. 6) in a gore 36 (FIGS. 4, 5, 6, 8, and 9 near the top 12 of the envelope 10 and has an inner portion 38 (FIGS. 5 to 7) located within the envelope. The tube portion 38 is heat-sealed closed at its inner end 40 (FIGS. 5 and 7) and is perforated as at 42 to provide an aggregate gas discharge area which is sufficiently less than the cylindrical inside cross-sectional area of the outer end, or inlet 43, of the tube portion 38 to provide back pressure necessary to preclude surging, which, if allowed to take place, could result in excessive whipping of said tube portion and resultant damage thereto and to adjacent gores and undue stressing of the heat seal (described below) between the tube 18 and the envelope 10.

The outer end of the tube portion 38 is doubled circumferentially upon itself to provide a two-ply radial flange 44 (FIG. 6) which is heat-sealed at 46 in a complete circle to the gore 36 adjacent the gore hole 34, and has a peripheral lip 47, with a fold 48 which is notched as at 50 to preclude entrapment of air or gas which, on expansion with increasing altitude, could rupture the seal.

An apron 54 (FIGS. 5, 6, 8, and 9) is heat-sealed, preferably discontinuously as at 56 (FIGS. 8 and 9), to the longitudinal margins of and outside the gore 36 and to the adjacent longitudinal margins of the neighbor gores 58, and is left unsealed at its upper and lower ends 59 and elsewhere so as to preclude entrapment of air which at high altitude could cause bulges, which could result in seal rupture. The width of the apron 54 between the sealing rows 56 somewhat exceeds the width of the gore between said rows, so that there is a fullness of apron material (see FIGS. 6 and 8) and hence this material will not lie flat throughout its width against the gore 36. The apron 54 is formed with a hole for the passage of the tube 18, and with radial cuts at the hole to provide an annular series of tabs 60 (FIGS. 6 and 9). Pressure-sensitive tapes 62 are applied shingle fashion in two annular arrays sandwiching and adhesively secured to the tabs 60, the arrays and tabs forming a flexible unit 68 having a radial flange 70 which overlies the gore 36, and also having a collar 72 extending from the flange in a direction away from the interior of the envelope 10.

The outer ply 76 (FIG. 6) of the flange 44 extends radially inward beyond the gore 36 and terminates at one end of a cylindrical portion 78 extending outward through the gore hole 34 and surrounded by the collar 72, the outer margin 80 of which is adhesively secured to the portion 78. The portion 78 extends a substantial distance beyond the collar 72 in a direction away from the interior of the envelope 10 and terminates in a fold 82 from which another tube portion 84 extends to surround the portion 78 and the collar 72 and to terminate at a fold 86 at the outside of the flange 70. The inflation tube 18 extends from the fold 86 away from the interior of the envelope 10 to merge with the main body of the tube portion 22.

The tubing is purchased in layflat form in a roll and thus may be somewhat weakened at the creases. The two creases are therefore reinforced by pressure sensitive tapes 92 extending throughout the length of the visible outside tube portion 22. Each tape 92 is somewhat longer than the outside tube portion 22 so as to also adhere to the outer surface of the apron 54 (FIGS. 5 and 6). Two additional and relatively short pressure-sensitive tapes 94 180° apart and 90° from the tapes 92 are applied to the tube portion 22 and to the outer surface of the apron 54. Four pressure-sensitive tapes 96 are applied diagonally to the outer surface of the apron 54, to adjacent portions of the flange 70, and to the outer surfaces of the tapes 92 and 94 adjacent the juncture of the tube portion 22 with the envelope 10. A pressure-sensitive tape 98 (omitted from FIG. 5 to avoid confusion) is applied circumferentially about and to the tube portion 22 and the adjacent portion of the tapes 92 and 94 near said juncture.

It will be observed that air or gas cannot be trapped in the fullness of tube material within which the collar 72 is located, nor between the flange 70 and the tube 18.

Four multi-layered pressure-sensitive patches 102 (FIG. 5) are applied, two to the outside of the margin of each of the gores 58. Pressure-sensitive tapes 104 (FIGS. 5 and 8) adhesively cover the longitudinal margins of the apron 54 and the adjacent margins of the gores 58 and patches 102. The several tapes 92, 94, and 96 are extended to terminate on the respective patches 102, and are adhesively covered thereat by relatively short transverse pressure-sensitive tapes 106 (FIG. 5) which also adhesively engage the patches.

The tube portions 78 and 84 extending from the fold 82 constitute a flexible tube section affording regions of fullness and will tend to straighten with longitudinal stress on the tube portion 22 and thus effectively relieve the seal 46 from such stress.

The gores, apron, and tubing are preferably formed of polyethylene or other suitable substantially inelastic balloon plastic film lending itself to heat-sealing techniques, and the several tapes are preferably pressure-sensitive and may be reinforced with fiberglass or other suitable material. The films shown on the drawing are exaggerated in thickness for convenience. Generally the thickness may be a fraction of a mil to a few mils, as the circumstances may require.

Obviously many modifications and variations of the invention are possible in the light of the above teachings. It is therefore to be understood that within the scope of the appended claims the invention may be practiced otherwise than as specifically described.

I claim:

1. In a high altitude balloon, a plastic film balloon envelope having a side opening, a plastic film inflation tube connected by a gas-tight seal to the envelope about the opening at the inner face of the envelope, the tube extending through the opening to the outside of the envelope, and means connected to the envelope and including the tube for relieving the seal from tensile stresses imposed on the tube.

2. In a high altitude balloon, a balloon envelope, a slack apron secured to the outside of the envelope, the envelope and apron having alined openings therethrough, an inflation tube passing through the openings and having an intermediate axially slack portion connected at one end to the envelope adjacent the envelope opening and at its other end to the apron adjacent the envelope opening, whereby the connection between the slack portion and envelope will be substantially relieved of tension imposed on the tube outside of the envelope beyond the slack portion of the tube.

3. The structure of claim 2, characterized in that the apron is so constructed and secured as to obviate air entrapment between the apron and the envelope.

4. The structure of claim 2, characterized in that the tube projects a substantial distance into the interior of the envelope and has a total discharge area which is substantially less than its inlet area.

5. The structure of claim 2, characterized in that the connection between the tube and the envelope is a circumferentially continuous heat seal.

6. In a method of inflating a high altitude balloon envelope having an inflation tube attached to the envelope near the top of the envelope and depending outside the envelope from its place of attachment, the steps of gathering the envelope and laying it out lengthwise over the ground, applying a restraint temporarily and completely closing the envelope adjacent and below the place of attachment of the tube to provide a gas compartment with the tube outside the envelope at the region of and free of the restraint, introducing inflation gas into the tube until the compartment is substantially full of gas, shifting the restraint progressively away from the top while continuing inflation so that the progressively enlarging compartment is maintained completely closed at its bottom and substantially full of gas, stopping the restraint shift and the inflation when the compartment has reached a predetermined gas volume, and closing the tube.

7. In a method of inflating and launching a high altitude balloon system comprising a balloon envelope having an inflation tube depending outside the envelope from its place of attachment to the envelope near the top of the envelope, the steps of gathering the envelope and laying it out lengthwise over the ground, applying a yieldable restraint temporarily closing the envelope adjacent and below the place of attachment of the tube to provide a temporary small inflation compartment above the restraint, with the tube outside the envelope at the region of and free of the restraint, introducing inflation gas into the tube until the compartment is substantially full of gas, continuing the inflation so that the increased gas pressure in said compartment shifts the restraint away from the top and the compartment progressively enlarges, stopping the restraint shift and the inflation when the compartment has reached a predetermined size capable of launching the system, closing the tube, and removing the restraint to enable the system to become airborne.

8. In a high altitude balloon, a balloon envelope having an opening, and an inflation tube folded to provide a two-ply annular portion heat-sealed in a continuous circle to the envelope about the opening, the seal being spaced from the fold, the fold being interrupted by a notch to avoid entrapment of air or gas between the seal and the fold.

9. In a high altitude balloon, a balloon envelope having an opening, an inflation tube folded to provide a two-ply annular portion heat-sealed in a continuous circle to the envelope about the opening, the seal being spaced from the fold, the fold being interrupted by a notch to avoid entrapment of air or gas between the seal and the fold, the tube having a portion which projects a substantial distance into the interior of the envelope and is open to discharge inflation gas, the fold being disposed within the envelope, the total of the discharge area of said portion and the area of discharge afforded by the notch in the event of rupture between the two plies being substantially less than the area of the inlet of the projecting tube portion.

References Cited in the file of this patent

UNITED STATES PATENTS

| | | |
|---|---|---|
| 2,758,803 | Winzen | Aug. 14, 1956 |
| 2,758,804 | Hakomaki | Aug. 14, 1956 |
| 2,900,147 | Huch et al. | Aug. 18, 1959 |
| 2,901,183 | Kohl | Aug. 25, 1959 |
| 2,919,083 | Suomi et al. | Dec. 29, 1959 |
| 2,950,131 | Hennen | Aug. 23, 1960 |
| 2,963,783 | Field | Dec. 13, 1960 |
| 2,977,069 | Huch et al. | Mar. 28, 1961 |